United States Patent [19]

Schoenauber et al.

[11] 3,821,262

[45] June 28, 1974

[54] PROCESS FOR THE PRODUCTION OF ANTHRAQUINONE DERIVATIVES CHLORINATED IN ALPHA-POSITIONS

[75] Inventors: Wolfgang Schoenauber, Riehen, Bagel; Karl Ulrich Steiner, Binningen, Baselland, both of Switzerland

[73] Assignee: Sandoz Ltd., Basle, Switzerland

[22] Filed: June 7, 1971

[21] Appl. No.: 150,733

Related U.S. Application Data

[63] Continuation-in-part of Ser. No. 750,016, Aug. 5, 1968, abandoned.

[30] Foreign Application Priority Data

| Aug. 11, 1967 | Switzerland | 11370/67 |
| Sept. 14, 1967 | Switzerland | 12875/67 |
| Mar. 8, 1968 | Switzerland | 3535/68 |
| June 6, 1968 | Switzerland | 8382/68 |

[52] U.S. Cl. 260/380, 260/381, 260/383

[51] Int. Cl. C09b 1/10, C09b 1/22, C09b 1/50
[58] Field of Search 260/381, 383, 380

[56] References Cited
UNITED STATES PATENTS
2,827,464    3/1958    Caliezi et al. .................. 260/275
FOREIGN PATENTS OR APPLICATIONS
1,199,279    8/1965    Germany ........................ 260/380

*Primary Examiner*—Lorraine A. Weinberger
*Assistant Examiner*—Robert Gerstl

[57] ABSTRACT

A process for the production of anthraquinone derivatives which are substituted in the 1,4-positions by amino and/or hydroxyl groups and are $\alpha$-chlorinated by chlorinating these derivatives in the form of the boric acid or boron fluoride complex compounds in the presence of halogenation catalysts, which consists in using for chlorination a mixture of oleum and chlorosulphonic acid or thionyl chloride.

9 Claims, No Drawings

PROCESS FOR THE PRODUCTION OF ANTHRAQUINONE DERIVATIVES CHLORINATED IN ALPHA-POSITIONS

This application is a continuation-in-part of our application Ser. No. 750,016, filed August 5, 1968 now abandoned.

The chlorination in the α-positions of anthraquinone derivatives substituted in the 1- and 4-positions by amino and/or hydroxyl groups is known. According to the DAS 1,199,279 it is effected by chlorinating the boric acid complex compounds of these derivatives in sulphuric acid, which may contain sulphur trioxide if desired, or in chlorosulphonic acid, and in the presence of halogenation catalysts, with subsequent hydrolysis of the chlorinated boric acid complexes. Chlorine gas is introduced to bring about chlorination. In place of the boric acid complex compounds of anthraquinone derivatives, the borofluoride complex compounds of these derivatives may be employed.

In the mentioned DAS 1,199,279 either chlorosulphonic or sulphuric acid or oleum are used as solvents for the HCl formed during the chlorination with the gaseous chlorine.

It is an object of the present invention to find a process for the α-chlorination of said complexes without using the dangerous gaseous chlorine and which is more economical than the chlorination with gaseous chlorine.

It has now been found that chlorosulphonic acid and thionyl chloride are excellent chlorinating agents for the α-chlorination of the above mentioned boric acid complexes and of the corresponding boron trifluoride complexes when employed in the presence of oleum and halogenation catalysts and in the absence of gaseous chlorine, provided that the quantity and concentration of $SO_3$ and chlorinating agent are sufficient to support α-chlorination of the complex and insufficient to lead to sulphonation under reaction conditions.

The present invention consists thus in a process for α-chlorinating an anthraquinone substituted in the 1- and 4-positions by amino and/or hydroxyl groups and in the form of a boric acid or boron trifluoride complex which consists essentially of chlorinating said anthraquinone in a reaction mixture consisting essentially of 1. said anthraquinone, which has at least one free α-position,
2. a halogenation catalyst selected from the group consisting of iodine and iodine-yielding agent and
3. a mixture of oleum and at least one equivalent of a chlorinating agent selected from the group consisting of chlorosulphonic acid and thionyl chloride per atoms of chlorine to be introduced into α-positions of said anthraquinone;

the concentration of sulphur trioxide in the reaction mixture being sufficient to support α-chlorination of the anthraquinone with the chlorinating agent under reaction conditions, and insufficient to sulphonate the anthraquinone under reaction conditions.

The chlorinated boron trifluoride or boric acid complex is then hydrolyzed to give the corresponding α-chlorinated anthraquinone, substituted in the 1- and 4-positions by amino and/or hydroxyl groups.

If not otherwise indicated, in the present specification by α-positions are meant the 5- and/or 8-positions of the anthraquinone nucleus.

The boric acid complex compounds can be easily obtained by dissolving boric acid in oleum and adding the amino- or hydroxy-anthraquinone, or alternatively by adding boric acid to the oleum solution of the amino- or hydroxy-anthraquinone. The borofluoride complex compounds are obtained by conducting boron fluoride into the oleum solution of the amino- or hydroxy-anthraquinone or dropping boron trifluoride dihydrate into this solution, or by dissolving boron fluoride or boron fluoride dihydrate in oleum and adding the amino- or hydroxy-anthraquinone, or again by suspending the amino- or hydroxyanthraquinone in boron fluoride dihydrate and adding oleum to the suspension. These complex compounds are known. It is preferable that all the amino and hydroxyl groups occurring in the anthraquinones to be chlorinated are present as boric acid or borofluoride complexes. At least 1 mole of boric acid or boron trifluoride per amino or hydroxyl group is employed, although an excess is not detrimental to the results.

The oleum may be employed in great strength and in great excess, but care must be taken that it does not sulphonate the starting product.

On formation of the boric acid or borofluoride complex, the reaction mixture contains approximately 10–75 percent or preferably 20–70 percent of free sulphur trioxide, calculated without taking into account the chlorinating agent. For the addition of the chlorinating agent it is good practice to take into account the quantity of free $SO_3$, i.e., in the presence of small quantities of $SO_3$ there are preferably employed larger quantities of chlorinating agent and vice versa by increasing the quantity of free $SO_3$ the quantity of chlorinating agent can be lowered.

When the chlorosulphonic acid acts mainly as a chlorine yielding agent only, the weight ratio of oleum to chlorosulphonic acid in the reaction medium, whch is employed preferably in excess, is about 10:1 to 3:1; when boric acid or boron fluoride dihydrate is used, the ratio is preferably 9:1 to 5:1, and with boron fluoride 8:1 to 3:1 or preferably 6:1 to 4:1. The weight ratio of oleum to thionyl chloride may vary from 20:1 to 6:1, the optimum ratios being 12:1 to 8:1 when boric acid or boron fluoride dihydrate is used and 10:1 to 7:1 when boron fluoride is used. The anthraquinones substituted in the 1- and 4-positions by amino and/or hydroxyl groups are treated with oleum and chlorosulphonic acid in the presence of a halogenation catalyst preferably at elevated temperatures, e.g. 50° to 110° C, or more particularly at 60° to 90° C, and the treatment is continued until the starting product is no longer indicated, for example, by chromatography of a sample of the reaction mixture. When oleum and thionyl chloride are employed, the reaction mixture is raised to a temperature in the range of about 60° to 100° C or, preferably, 70° to 90° C.

The chlorosulphonic acid must be employed in amounts providing at least 1 mole or preferably 1.1 to 1.5 moles per atom of chlorine to be introduced into the anthraquinone compounds. For the dichlorination of 1,4-dihydroxyanthraquinone, for example, preferably 2.2 to 3.0 moles of chlorosulphonic acid are employed per 1 mole of 1,4-dihydroxyanthraquinone, although substantial excess, e.g. 10 or more moles, has no adverse effect: here the chlorosulphonic acid acts partly as a solvent. In theory thionyl chloride should yield 2 chlorine atoms, but as it is more highly volatile than chlorosulphonic acid at the reaction temperature, greater amounts are lost by evaporation or by entrapment by the evolved sulphur dioxide. For this reason it is advisable to employ approximately 1.8 to 2.5 moles of thionyl chlorine instead of one mole for the introduction of two chlorine atoms. Here again a great excess has no adverse effect.

Of the amino- and hydroxy-anthraquinones to be employed as starting products in the process of this invention, the most important technically are 1,4-dihydroxyanthraquinone (quinizarine), 1-amino-4-hydroxyanthraquinone, 1,4-diaminoanthraquinone, 1,4-dihydroxy-2-chloro- and -5-chloro-anthraquinone.

Examples of suitable halogenation catalysts are iodine and agents which yield iodine under the reaction conditions, such as iodine chloride, alkali metal iodides and also magnesium, cadmium and zinc iodide. The amount of iodine or iodine yielding agent can be 1–10 percent or preferably 2–5 percent of the amount of the amino- and/or hydroxy-anthraquinone for chlorination.

The chlorination products can be isolated in the known way, for example by running the reaction mixture into ample water, stirring the suspension if desired at elevated temperature until the boric acid or borofluoride complex is fully hydrolyzed, followed by suction filtering, washing and drying. These products are obtained in good to very good yield, e.g. 90 percent to almost 100 percent.

In the Examples the parts and percentages are by weight and the temperatures in degrees centigrade.

EXAMPLE 1

14 Parts of boric acid are entered into 330 parts of 65 percent oleum with cooling and completely dissolved by gradual heating. 105 Parts of chlorosulphonic acid are added, followed at 15°–20° by 24 parts of quinizarine. After stirring for 1 hour 0.5 part of iodide is added and the temperature is increased to 70°, on which stirring is continued at this temperature until a chromatogram of the reaction mixture shows that the quinizarine has disappeared. The reaction mixture is then cooled to 20° and run into 2,000 parts of icewater. The suspension is raised to 80°–90° and stirred for 1 hour at this temperature, after which the product is filtered off and washed until of neutral reaction. It consists of 5,8-dichloroquinizarine which is dried at 100°.

EXAMPLE 2

A solution of 15 parts of boric acid in 250 parts of 65 percent oleum is prepared and 24 parts of quinizarine was added to it with cooling. After stirring for some time at 20°–25° 50 parts of chlorosulphonic acid and 0.5 part of iodine are added, the temperature is raised to 70° and the mixture stirred at this temperature until no further quinizarine is indicated. The 5,8-dichloroquinizarine thus formed is isolated as described in Example 1.

EXAMPLE 3

15 Parts of boric acid are dissolved in 190 Parts of 65 percent oleum, 50 parts of chlorosulphonic acid are added, then 24 parts of quinizarine are entered with good stirring, after which the temperature is raised to 50° and 1 part of iodine added. When the solution contains no further quinizarine it is worked up as described in Example 1. The product, 5,8-dichloroquinizarine, is obtained in good yields.

EXAMPLE 4

14.5 Parts of boric acid are dissolved in 240 parts of 65 percent oleum, 24 parts of quinizarine are added with cooling and the mixture is stirred for some time. Then 27 parts of chlorosulphonic acid and 0.5 part of iodine are added. The temperature is increased to 60° and the mixture stirred at this temperature until no further quinizarine is indicated. It is cooled to 20° and run into 1,500 parts of ice water. The suspension is raised to 80°–90° and stirred for 1 hour at this temperature, after which the product is filtered off, washed with water until neutral and dried. It consists of 5,8-dichloroquinizarine.

EXAMPLE 5

15 Parts of boron trifluoride are conducted into 165 parts of 65 percent oleum with cooling. 24 Parts of quinizarine are added, stirring is continued for some time, then 35 parts of chlorosulphonic acid and 0.5 part of iodine are added. The temperature is raised to 70° and the solution stirred at this temperature until the quinizarine has disappeared. On cooling to 20° the reaction mixture is run into 1,500 parts of ice water, the temperature of this suspension is raised to 80°–90° and the suspension stirred for some time at this temperature. The 5,8-dichloroquinizarine thus formed is filtered off, washed with water and dried.

EXAMPLE 6

At 5°–10° 24 parts of quinizarine are entered into a solution of 13 parts of boron trifluoride in 250 parts of 65 percent oleum. When everything is dissolved, the temperature is raised to 70°, 1 part of iodine is added and 27 parts of thionyl chloride are dropped in. The reaction mixture is held at 70°–75° with vigorous stirring until no further quinizarine is indicated. The reaction product, 5,8-dichloroquinizarine, is isolated as given in Example 1; it is obtained in every good yield.

EXAMPLE 7

23 Parts of boron trifluoride dihydrate and 24 parts of quinizarine are dissolved at room temperature in 300 parts of 57 percent oleum and the solution is heated to 70°. After the addition of 0.8 part of iodine, 26 parts of thionyl chloride are dropped in. After stirring for 15–20 hours at 70°–75°, no further starting material is indicated. The 5,8-dichloroquinizarine formed is isolated as described in Example 1.

EXAMPLE 8

15 Parts of boric acid are dissolved at 60° in 118 parts of oleum with an $SO_3$ content of 65–70 percent. 107 Parts of chlorosulphonic acid are added to the solution at 20°–25°, followed by 24 parts of 1-amino-4-hydroxyanthraquinone. The temperature is raised to 60° and the solution stirred for 2 hours at this temperature, after which 0.5 part of iodine is added. Stirring is continued at 70° until no further starting material is indicated in a chromatogram. The solution is allowed to cool to room temperature and poured into a mixture of 1,000 parts of ice and 500 parts of water. The suspension is stirred for some time, after which the reaction product is filtered off, washed with water until neutral and dried. This procedure results in 1-amino-4- hydroxy-5,8-dichloroanthraquinone in very good yield.

EXAMPLE 9

15 Parts of boric acid are dissolved with heating in a mixture of 55 parts of 100 percent sulphuric acid and 295 parts of oleum with an $SO_3$ content of 65–70 percent. On cooling to room temperature 24 parts of 1,4-diaminoanthraquinone are entered into the solution, which is then raised to 60° and stirred for 1 hour at this temperature. Then 36 parts of chlorosulphonic acid and 0.5 part of iodine are added and stirring is continued until no further starting material is indicated. The solution is cooled to room temperature and discharged into a mixture of 1,000 parts of ice and 1,000 parts of water. The suspension is stirred for some time and then filtered. The filter cake is stirred into 200 parts of water made weakly alkaline with ammonia solution. This suspension again is filtered and the product washed with water until neutral and dried. In this way 1,4-diamino-5,8-dichloroanthraquinone is obtained in very good yield.

EXAMPLE 10

15 Parts of boric acid are dissolved with heating in 79 parts of oleum with an $SO_3$ content of 65–70 percent. On cooling to room temperature, 143 parts of chlorosulphonic acid are added, followed by 24 parts of 1,4-diaminoanthraquinone. The solution is raised to 60° and stirred at this temperature for 2 hours, after which 0.5 part of iodine is added and stirring continued at 70° until no further starting material is indicated. On working up the reaction mixture by the procedure of Example 10, the dichlorodiaminoanthraquinone is obtained in good yield.

EXAMPLE 11

A solution of 14 parts of boric acid in a mixture of 37 parts of 100 percent sulphuric acid and 295 parts of oleum with an $SO_3$ content of 65–70 percent is prepared with heating. At room temperature 24 parts of 1-amino-4-hydroxyanthraquinone are added to the solution which is then stirred for 2 hours, after which 36 parts of chlorosulphonic acid and 0.5 part of iodine are added. The solution is raised to 65° and stirred at 65°–70° until the starting products are no longer indicated in a chromatogram. The product is then worked up as described in Example 8. It is 1-amino-4-hydroxy-5,8-dichloroanthraquinone and is obtained in good yield.

EXAMPLE 12

14 Parts of boric acid are dissolved with heating in a mixture of 118 parts of oleum with an $SO_3$ content of 65–70 percent and 78 parts of oleum with an $SO_3$ content of 26 percent. 24 Parts of 1-amino-4-hydroxyanthraquinone are entered at 40°, the temperature is raised to 60° and the mixture is stirred for 2 hours at this temperature. Then 0.6 part of iodine and 25 parts of thionyl chloride are added and stirring is continued at 70°–75° until the starting material is no longer indicated. The further procedure follows that of Example 8 and results in 1-amino-4-hydroxy-5,8-dichloroanthraquinone in good yield.

EXAMPLE 13

In place of the 1-amino-4-hydroxyanthraquinone employed in Example 12 an equal number of parts of 1,4-diaminoanthraquinone can be employed, on which 1,4-diamino-5,8-dichloroanthraquinone is obtained in good yield.

EXAMPLE 14

24 Parts of quinizarine are introduced at room temperature into a solution of 25 parts of boron trifluoride dihydrate in 240 parts of 65 percent oleum and dissolved by stirring. Then 35 parts of chlorosulphonic acid and 1 part of iodine are added, the reaction mixture is heated to 70° and stirred at this temperature until the quinizarine has disappeared. The obtained 5,8-dichloroquinizanine is isolated in the manner described in Example 1.

EXAMPLE 15

24 Parts of quinizarine are suspended in 28 parts of boron trifluoride dihydrate. 250 Parts of 65 percent oleum are dropped in so slowly that the temperature remains below 25° and no boron trifluoride can escape. The reaction mixture is heated showly with stirring to 70°, 1 part iodine and 35 parts of chlorosulphonic acid are added and stirring is continued at 70° until no more quinizarine is detectable. The produced 5,8-dichloroquinizarine is isolated as in Example 1.

EXAMPLE 16

70 Parts of boric acid are introduced with cooling into 92 parts of 27 percent oleum and dissolved by stirring. Then 395 parts of 65 percent oleum are dropped in and 120 parts of quinizarine are added gradually and the whole is stirred for a while. 590 Parts of 65 percent oleum, 175 parts of chlorosulphonic acid and 2.5 parts of iodine are added, the reaction mixture is heated to 70° and stirred at 70° until all the quinizarine has disappeared, then cooled to 20° and poured into 5,000 parts of water. The suspension is heated for 1 hour at 80°, then filtered off, washed with water until the wash water is neutral and dried. A good yield of 5,8-dichloroquinizarine is obtained.

EXAMPLE 17

70 Parts of boric acid are introduced with cooling into a mixture of 60 parts of 27 percent oleum and 60 parts of 65 percent oleum and dissolved by heating. Then 390 parts of 65 percent oleum are added at about 20°–25°, 120 parts of quinizarine are introduced and dissolved by stirring. After the addition of 590 parts of 65 percent oleum, 175 parts of chlorosulfonic acid and 2.5 parts of finely powdered iodine, the mixture is heated to 68°–70° and held at this temperature until no more starting product is indicated. The mixture is cooled to room temperature and poured into 5,000 parts of water. The 5,8-dichloroquinizarine is isolated in good yield according to the details given in Example 16.

EXAMPLE 18

120 Parts of quinizarine are introduced with cooling into 250 parts of 25 percent oleum, and 115 parts of boron trifluoride dihydrate and 1,200 parts of 65 percent oleum are dropped in simultaneously, the temperature being held at about 20° in order to avoid a sulphonation of the quinizarine. Then 180 parts of chlorosulphonic acid and 5.0 parts of iodine are added. The reaction mixture is heated to 70° and maintained at 70° until no more starting product is detectable. The formed 5,8-dichloroquinizarine is isolated in equal quality and yield as in the preceding Examples.

The chlorinated anthraquinone derivatives bearing amino and/or hydroxy groups in the 1,4-positions are valuable intermediates, e.g., for the production of dyes by exchanging the chlorine atoms in α-positions for alkyl-, aralkyl-, cycloalkyl- or arylamino groups. For instance the dye Acid Green 41 (62, 560) is obtained by condensing one mole of 1,4-dihydroxy-5,8-dichloroanthraquinone with two moles of 1-amino-4-methylbenzene and sulfonating the condensation product.

Having thus disclosed the invention, what we claim is:

1. A process for α-chlorinating an anthraquinone substituted in the 1- and 4-positions by amino and/or hydroxyl groups and in the form of a boric acid or boron trifluoride complex which consists essentially of chlorinating the anthraquinone in a reaction mixture consisting essentially of
    1. said anthraquinone, which has at least one free α-position,
    2. a halogenation catalyst selected from the group consisting of iodine and an iodine-yielding agent and
    3. a mixture of oleum and at least one equivalent of a chlorinating agent selected from the group consisting of chlorosulfonic acid and thionyl chloride per atom of chlorine to be introduced into α-positions of said anthraquinone;

sulfur trioxide in the reaction mixture being sufficient to support α-chlorination of the anthraquinone with the chlorinating agent under reaction conditions, and insufficient to sulphonate the anthraquinone under reaction conditions.

2. A process according to claim 1 which is effected at a temperature between 50° and 110° C and wherein the reaction mixture at the beginning of the chlorination reaction has an approximate concentration of sulfur trioxide in the range of from 10 to 75 percent, calculated without taking into account the chlorinating agent.

3. A process according to claim 2, wherein the reaction mixture at the beginning of the chlorinating reaction has an approximate concentration of sulfur trioxide in the range of from 20 to 70 percent, calculated without taking into account the chlorinating agent.

4. A process according to claim 2, wherein the chlorinating agent is chlorosulfonic acid.

5. A process according to claim 4, wherein the temperature is within the range of 60° to 90° C.

6. A process according to claim 2, wherein the chlorinating agent is thionyl chloride and the temperature is within the range of from 60° to 100°C.

7. A process according to claim 6, wherein the temperature is within the range of from 70° to 90° C.

8. A process according to claim 1 wherein the amount of oleum present is in a weight ratio in the range 10:1 to 3:1 with respect to chlorosulfonic acid or 20:1 to 6:1 with respect to thionyl chloride.

9. A process according to claim 1 wherein the halogenation catalyst is present in an amount of 1 to 10 percent by weight of the anthraquinone.

* * * * *